US009680161B2

(12) United States Patent
Yang et al.

(10) Patent No.: US 9,680,161 B2
(45) Date of Patent: Jun. 13, 2017

(54) NOBLE METAL-BASED ELECTROCATALYST AND METHOD OF TREATING A NOBLE METAL-BASED ELECTROCATALYST

(71) Applicant: The Board of Trustees of the University of Illinois, Urbana, IL (US)

(72) Inventors: Hong Yang, Champaign, IL (US); Jianbo Wu, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 279 days.

(21) Appl. No.: 14/331,697

(22) Filed: Jul. 15, 2014

(65) Prior Publication Data
US 2015/0017570 A1    Jan. 15, 2015

Related U.S. Application Data

(60) Provisional application No. 61/846,553, filed on Jul. 15, 2013.

(51) Int. Cl.
*H01M 8/02* (2016.01)
*H01M 4/92* (2006.01)

(52) U.S. Cl.
CPC ........... *H01M 4/926* (2013.01); *H01M 4/921* (2013.01)

(58) Field of Classification Search
CPC ....................................................... H01M 8/02
See application file for complete search history.

(56) References Cited

U.S. PATENT DOCUMENTS

2011/0165496 A1* 7/2011 Shirvanian .......... H01M 4/8642
429/483
2013/0133483 A1   5/2013 Yang et al.

OTHER PUBLICATIONS

Adhikari, Hemant et al., "Metastability of Au—Ge Liquid Nanocatalysts: Ge Vapor-Liquid-Solid Nanowire Growth Far below the Bulk Eutectic Temperature," *ACS Nano*, 1, 5 (2007) pp. 415-422.
Andersson, Klas J. et al., "Adsorption-Driven Surface Segregation of the Less Reactive Alloy Component," *J. Am. Chem. Soc.*, 131, 6 (2009) pp. 2404-2407.
Baletto, F. et al., "Growth of Three-Shell Onionlike Bimetallic Nanoparticles," *Physical Review Letters*, 90, 13 (2003) pp. 135504-1-135504-4.
Callejas-Tovar, Rafael et al., Oxygen adsorption and surface segregation in (211) surfaces of Pt(shell)/M(core) and $Pt_3$ M (M = Co, Ir) alloys, *Surface Science*, 602 (2008) pp. 3531-3539.
(Continued)

*Primary Examiner* — Jacob Marks
(74) *Attorney, Agent, or Firm* — Brinks Gilson & Lione (57) ABSTRACT

A noble metal-based electrocatalyst comprises a bimetallic particle comprising a noble metal and a non-noble metal and having a polyhedral shape. The bimetallic particle comprises a surface-segregated composition where an atomic ratio of the noble metal to the non-noble metal is higher in a surface region and in a core region than in a sub-surface region between the surface and core regions. A method of treating a noble metal-based electrocatalyst comprises annealing a bimetallic particle comprising a noble metal and a non-noble metal and having a polyhedral shape at a temperature in the range of from about 100° C. to about 1100° C.

12 Claims, 6 Drawing Sheets

(56) References Cited

OTHER PUBLICATIONS

Calvo, Sergio R. et al., "Density functional theory analysis of reactivity of $Pt_x Pd_y$ alloy clusters," *Surface Science*, 601 (2007) pp. 165-171.
Cheng, Daojian et al., "The Onion-Ring Structure for Pd Pt Bimetallic Clusters," *Journal of Physical Chemistry B*, 110, 33 (2006) pp. 16193-16196.
Cheng, Daojian et al., "Thermal behavior of core-shell and three-shell layered clusters: Melting of $Cu_1 Au_{54}$ and $Cu_{12} Au_{43}$," *Physical Review B*, 74 (2006) pp. 064117-1-064117-11.
Cui, Chunhua et al., "Compositional segregation in shaped Pt alloy nanoparticles and their structural behaviour during electrocatalysis," *Nature Materials*, Jun. 16, 2013, DOI:10.1038/NMAT3668, pp. 1-7.
Gasteiger, Hubert A. et al., "Activity benchmarks and requirements for Pt, Pt-alloy, and non-Pt oxygen reduction catalysts for PEMFCs," *Applied Catalysis B: Environmental*, 56 (2005) pp. 9-35.
Greeley, Jeff et al., "Large-scale, density functional theory-based screening of alloys for hydrogen evolution," *Surface Science*, 601 (2007) pp. 1590-1598.
Hills, Charles W. et al., "The Size-Dependent Structural Phase Behaviors of Supported Bimetallic (Pt—Ru) Nanoparticles," *J. Phys. Chem. B*, 107, 12 (2003) pp. 2626-2636.
Khanra, B.C. et al., "Effect of surface segregation on the catalytic activity of alloys: CO hydrogenation on Pd—Ni(111) surface," *Journal of Molecular Catalysis A: Chemical*, 129 (1998) pp. 233-240.
Lamas, Eduardo J. et al., "Oxygen Reduction on $Pd_{0.75}Co_{0.25}$(111) and $Pt_{0.75}Co_{0.25}$(111) Surfaces: An ab Initio Comparative Study," *J. Chem. Theory Comput.*, 2, 5 (2006) pp. 1388-1394.
Lequien, F. et al., "Dynamical equilibrium in nanoalloys," *Faraday Discuss.*, 138 (2008) pp. 105-117.
Liu, H. B. et al., "Structural Transformation of Au—Pd Bimetallic Nanoclusters on Thermal Heating and Cooling: A Dynamic Analysis," *J. Phys. Chem. B*, 110, 11 (2006) pp. 5191-5195.
Mainardi, Daniela S. et al., "Surface Segregation in Bimetallic Nanoclusters: Geometric and Thermodynamic Effects," *International Journal of Quantum Chemistry*, 85, 4/5 (2001) pp. 580-591.
Mainardi, Daniela S. et al., "Monte Carlo Simulation of Cu—Ni Nanoclusters: Surface Segregation Studies," *Langmuir*, 17, 6 (2001) pp. 2047-2050.
Ma, Yuguang et al., "Pt surface segregation in bimetallic $Pt_3M$ alloys: A density functional theory study," *Surface Science* 602 (2008) pp. 107-113.
Ma, Yuguang et al., "Surface segregation in bimetallic $Pt_3M$ (M = Fe, Co, Ni) alloys with adsorbed oxygen," *Surface Science*, 603 (2009) pp. 349-353.
Mayrhofer, Karl J. J. et al., "Degradation of Carbon-Supported Pt Bimetallic Nanoparticles by Surface Segregation," *J. Am. Chem. Soc.*, 131, 45 (2009) pp. 16348-16349.
Mejia-Rosales, Sergio J. et al., "Two-Stage Melting of Au—Pd Nanoparticles," *J. Phys. Chem. B*, 110, 26 (2006) pp. 12884-12889.
Ouyang, G. et al., "Solid solubility limit in alloying nanoparticles," *Nanotechnology*, 17 (2006) pp. 4257-4262.
Peng, Zhenmeng et al., "Ag—Pt alloy nanoparticles with the compositions in the miscibility gap," *Journal of Solid State Chemistry*, 181 (2008) pp. 1546-1551.
Qin, F. et al., "Segregation of Pt at clean surfaces of $(Pt, Ni)_3Al$," *Surface Science*, 601 (2007) pp. 376-380.
Ramirez-Caballero, Gustavo E. et al., "Surface segregation of core atoms in core-shell structures," *Chemical Physics Letters*, 456 (2008) pp. 64-67.
Shirinyan, A.S. et al., "Phase diagram versus diagram of solubility: What is the difference for nanosystems?," *Acta Materialia*, 53 (2005) pp. 5025-5032.
Shirinyan, A. et al., "Solubility diagram of the Cu—Ni nanosystem," *J. Phys.: Condens. Matter*, 18 (2006) pp. 2537-2551.
Shirinyan, A.S. et al., "On phase changes in nanosystems," *Materials Science and Engineering C*, 26 (2006) pp. 735-738.
Stamenkovic, Vojislav et al., "Changing the Activity of Electrocatalysts for Oxygen Reduction by Tuning the Surface Electronic Structure," *Angew. Chem. Int. Ed.*, 45 (2006) pp. 2897-2901.
Stamenkovic, Vojislav R. et al., "Improved Oxygen Reduction Activity on $Pt_3Ni$(111) via Increased Surface Site Availability," *Science*, 315 (2007) pp. 493-497.
Strasser, Peter et al., "Lattice-strain control of the activity in dealloyed core-shell fuel cell catalysts," *Nature Chemistry*, 2 (2010) pp. 454-460.
Tafen, D.N. et al., "Oxygen-induced Y surface segregation in a CuPdY ternary alloy," *Surface Science*, 608 (2013) pp. 61-66.
Tao, Feng et al., "Reaction-Driven Restructuring of Rh—Pd and Pt—Pd Core-Shell Nanoparticles," *Science*, 322 (Nov. 7, 2008) pp. 932-934.
Tersoff, J., "Kinetic surface segregation and the evolution of nanostructures," *Applied Physics Letters*, 83, 2 (Jul. 14, 2003) pp. 353-355.
Van Hoof, T. et al., "Structural and thermodynamic properties of Ag—Co nanoclusters," *Physical Review B*, 72 (2005) pp. 115434-1-115434-12.
Wang, Chao et al., "Design and Synthesis of Bimetallic Electrocatalyst with Multilayered Pt-Skin Surfaces," *Journal of the American Chemical Society*, 133 (2011) pp. 14396-14403.
Wang, Guofeng et al., "Quantitative prediction of surface segregation in bimetallic Pt-M alloy nanoparticles (M = Ni, Re, Mo)," *Progress in Surface Science*, 79 (2005) pp. 28-45.
Wautelet, M et al., "Phase diagrams of small particles of binary systems: a theoretical approach," *Nanotechnology*, 11 (2000) pp. 6-9.

* cited by examiner

NOBLE METAL-BASED ELECTROCATALYST AND METHOD OF TREATING A NOBLE METAL-BASED ELECTROCATALYST

RELATED APPLICATION

The present patent document claims the benefit of priority to U.S. Provisional Patent Application Ser. No. 61/846,553, which was filed on Jul. 15, 2013, and is hereby incorporated by reference in its entirety.

FEDERALLY SPONSORED RESEARCH OR DEVELOPMENT

This invention was made with United States government support from the National Science Foundation under contract no. CHE 12-13926. The United States government has certain rights in this invention.

TECHNICAL FIELD

This disclosure is related generally to electrocatalysis and more particularly to noble metal-based electrocatalysts for oxygen reduction reaction (ORR).

BACKGROUND

Noble metals such as platinum possess important catalytic properties for a range of chemical reactions. Such catalytic properties relate to the superior ability of these metals to absorb and dissociate hydrogen, carbon monoxide, sulfur, nitrogen oxides and various other molecules. For example, platinum has been used in automotive applications as an active component for catalyzing decomposition of various toxic exhaust gases. An important catalytic property of platinum is its ability to absorb and dissociate chemical species such as hydrogen and oxygen gases. This catalytic property has allowed platinum and its alloys to be used as catalysts for commercially important partial oxidation and reduction reactions in pharmaceutical compound manufacturing and in low-temperature fuel cells. Proton exchange membrane fuel cells (PEMFCs) using hydrogen as fuel have been important in the development of clean energy sources, and direct methanol fuel cells (DMFCs) have been developed as power sources for portable microelectronic devices. PEMFCs are also being developed as potential power sources for microeletronic devices such as notebook computers.

One challenge relating to the use of platinum catalysts is the high cost of platinum. Because of this high cost, it would be advantageous to be able to reduce consumption of platinum without sacrificing catalytic performance in practical applications. The high activity of noble metal catalysts may be closely related to the shape of the catalysts. Electrocatalysts used in PEMFCs and DMFCs have traditionally been made of carbon-black supported nanoparticles of platinum and platinum alloys, such as PtRh, PtCo, PtFe and PtNi. Commercially available electrocatalysts include, for example, porous carbon supported platinum nanoparticles sold under the name Vulcan XC-72R by E-TEK. Small particle size is believed to be important to achieve a catalyst having a large surface area.

Improving the sluggish kinetics of the electrocatalytic oxygen reduction reaction (ORR) may be critical to advancing hydrogen fuel cell technology. An important threshold value in ORR catalyst activity is a four-fold improvement in activity per unit mass of platinum (Pt) over the current commercial carbon-supported Pt catalyst (Pt/C) used in the vehicle fuel cells, which could allow fuel-cell powertrains to become cost-competitive with their internal-combustion counterparts.

Surface segregation is a metallographic behavior that may occur in bulk binary alloys based on the miscibility of bimetallic phase diagram in which chemical composition at surface differs from that in bulk. Based on both theoretical studies and some experimental data, when the dimension or crystal domain of a bimetallic alloy is reduced to the nanoscale, the miscibility between the component metal elements may be increased due to the larger fraction of atoms at surface or interfacial regions. Thus, an alloy with an even distribution of components may be produced. However, it may be possible to reconstruct the surface atoms of nanoparticles through post-synthesis treatments. Calculations indicate that segregation on surfaces of metal catalysts can influence the catalytic performance by modulating the binding energy and surface geometry of the metal surface and reactant molecules.

BRIEF SUMMARY

A noble metal-based electrocatalyst comprises a bimetallic particle comprising a noble metal and a non-noble metal and having a polyhedral shape. The bimetallic particle comprises a surface-segregated composition where an atomic ratio of the noble metal to the non-noble metal is higher in a surface region and in a core region than in a sub-surface region between the surface and core regions.

A method of treating a noble metal-based electrocatalyst comprises annealing a bimetallic particle comprising a noble metal and a non-noble metal and having a polyhedral shape at a temperature in the range of from about 100° C. to about 1100° C.

DETAILED DESCRIPTION

A noble metal-based electrocatalyst exhibiting improved ORR activity may be formed by inducing surface segregation in a bimetallic particle using an appropriate thermal treatment, as described herein. The ORR activity of the annealed bimetallic particle may be further enhanced with a suitable electrochemical treatment.

The bimetallic particle comprises a noble metal and a non-noble metal and has a polyhedral shape. The bimetallic particle may be a nanocrystal with a size of at least about 10 nm, where the size may represent the distance between opposing vertices of the polyhedron or between an opposing facet and vertex, depending on the geometry of the polyhedron. In one example, as set forth in more detail below, the noble metal comprises Pt, the non-noble metal comprises Ni, and the bimetallic particle is synthesized to have the nominal composition of Pt$_3$Ni. The bimetallic particle may also have an octahedral shape.

Surface segregation may be induced in the bimetallic particle by annealing the bimetallic particle in a controlled environment at a suitable temperature. The annealing temperature may be at least about 100° C., at least about 200° C., at least about 300° C., at least about 400° C., or at least about 500° C. Typically, the temperature does not exceed about 1100° C., and the temperature also may not exceed about 900° C., about 800° C., about 700° C., about 600° C., or about 500° C. For example, the annealing temperature may be in the range of from about 100° C. to about 1100° C., or from about 100° C. to about 700° C.

The annealing is preferably carried out in a vacuum environment, but in some cases an inert gas environment (e.g., He, Ar and/or N$_2$ gas) may be suitable. The vacuum environment is typically a controlled environment maintained at a gas pressure of about $10^{-2}$ Pa or lower, $10^{-3}$ Pa or lower, about $10^{-4}$ Pa or lower, or about $10^{-5}$ Pa or lower.

The duration of the annealing may be from about 2 minutes to about 2 hours. Typically, the annealing is carried out for a time duration of about 20 minutes to 2 hours, or from about 30 minutes to about 1.5 hours.

The resulting bimetallic particle has a surface-segregated composition, where an atomic ratio of the noble metal to the non-noble metal is higher in the core region and in the surface region than in a sub-surface region therebetween. This compositional sandwich structure is a consequence of segregation of the non-noble metal during annealing. The annealed bimetallic particle may exhibit an ORR activity of at least about 0.5 mA per microgram of the noble metal, at least about 0.7 mA per microgram of the noble metal, at least about 1.0 mA per microgram of the noble metal, at least about 1.3 mA per microgram of the noble metal, or at least about 1.5 mA per microgram of the noble metal. In some cases, the ORR activity of the annealed bimetallic particle may be as high as 2.0 mA per microgram of the noble metal.

Figure 1:
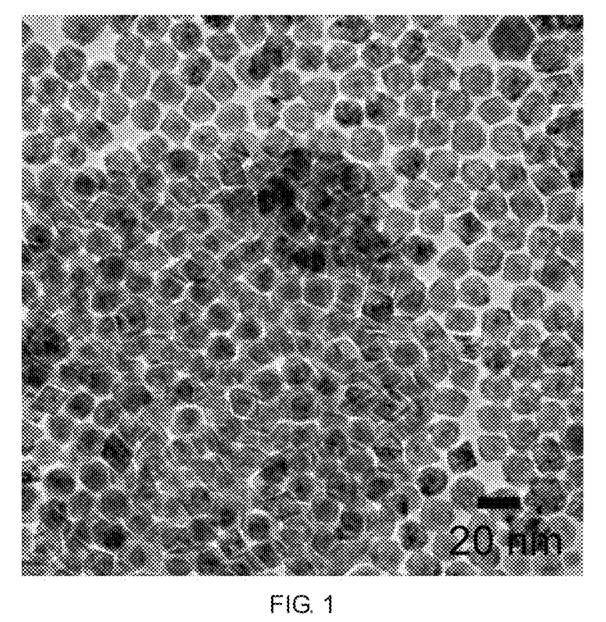
FIG. 1 is a low magnification transmission electron microscope (TEM) image of $Pt_3Ni$ octahedra after an exemplary annealing treatment in vacuum at 210° C. for 1 hour.

FIG. 1 shows transmission electron microscopy (TEM) images of exemplary Pt$_3$Ni octahedral nanocrystals (particles) after an annealing treatment in vacuum at 210° C. for 1 hour. The octahedral morphology of the particles is preserved after annealing, and the nanocrystals exhibit a similar size compared with the as-synthesized Pt$_3$Ni nanocrystals. However, the annealed particles are aggregated because the capping agent, which is used to protect the particles from agglomeration during synthesis, is largely removed during annealing. When the bimetallic particles are attached to a carbon support or other support, annealing-induced agglomeration of the particles may be prevented.

Figure 2:
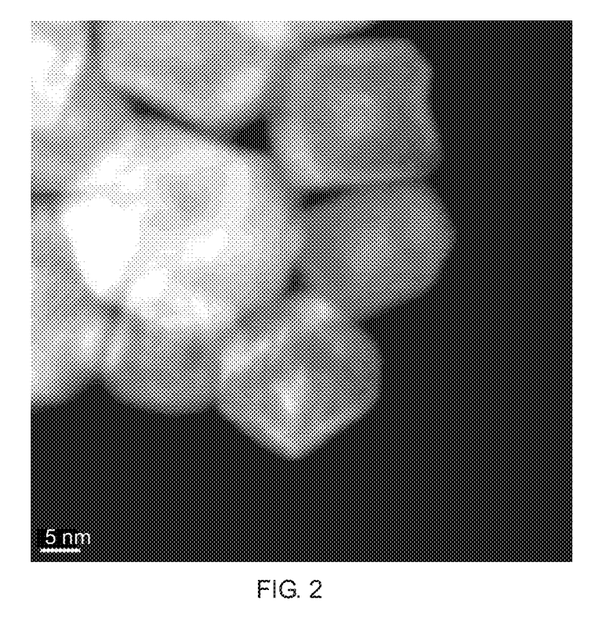
FIG. 2 is a scanning transmission electron microscope (SEM) image of $Pt_3Ni$ octahedra after annealing in vacuum 210° C. for 1 hour.

Using the Z contrast scanning TEM (STEM) mode, it can be seen that the annealed Pt$_3$Ni nanocrystals include two brighter regions, which indicate a heavier species, and one darker region, which indicates a lighter species. The brighter regions appear at the surface region and in the center or core region (FIG. 2). The micrographs indicate that the size of the core region is about 5 nm and the surface region is about 1.5 nm in thickness, which corresponds to about 7 atomic layers. The darker region between the surface region and the core region is about 5 nm in thickness.

Figure 3:
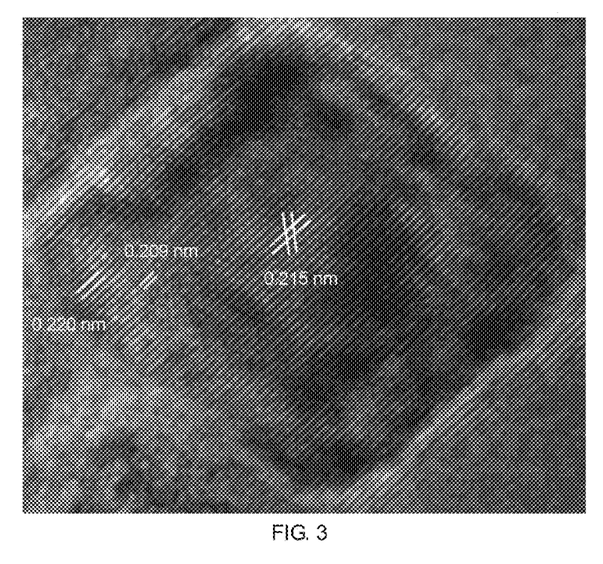
FIG. 3 is a high magnification TEM image of $Pt_3Ni$ octahedra after annealing in vacuum at 210° C. for 1 hour.
Figure 4:
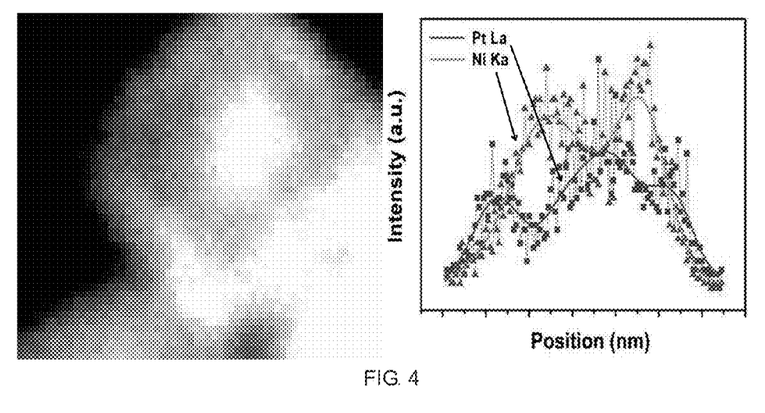
FIG. 4 is an illustration of Ni segregation on $Pt_3Ni$ octahedra after annealing in vacuum at 210° C. for 1 hour.

The d-spacings of these three different regions were calculated to be 0.215 nm for the core region, 0.209 nm for the sub-surface region, and 0.220 nm for the surface region or shell, which also indicates that the lighter species is segregated in the sub-surface layers, as shown for example in FIG. 3. The further identification of the Pt and Ni distribution within a single Pt$_3$Ni octahedral particle was carried out using a STEM with energy dispersive x-ray spectroscopy (EDX) capabilities. The STEM-EDX analysis shows that Pt is rich at the center and the edge of the particle, while Ni is segregated in between (e.g., see FIG. 4).

Figure 5:
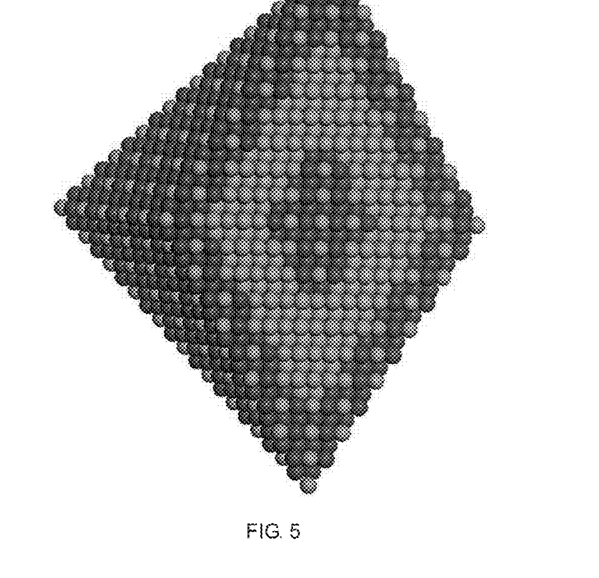
FIG. 5 is line scan of Pt and Ni on an individual $Pt_3Ni$ octahedron after annealing in vacuum at 210° C. for 1 hour.

Quantitative analysis shows that the composition of the exemplary Pt$_3$Ni particle after annealing is Pt$_{76.7}$Ni$_{23.3}$ in the core region, Pt$_{53.6}$Ni$_{46.4}$ in the sub-surface region and Pt$_{70.3}$Ni$_{29.2}$ at the surface region. These characterization data show that a Pt$_a$Ni$_b$/Pt$_c$Ni$_d$/Pt$_e$Ni$_f$ sandwich structure (where the sum of a+b is nominally 100, the sum of c+d is nominally 100, and the sum of e+f is nominally 100), as illustrated in FIG. 5, is formed via nickel segregation upon annealing under suitable conditions. The sandwich structure includes a higher atomic ratio of the noble metal to the non-noble metal in the core region and in the surface region than in the sub-surface region. In this particular example, the atomic ratio of the noble metal to the non-noble metal in the core region is a/b=76.7/23.3 or 3.3; the atomic ratio of the noble metal to the non-noble metal in the sub-surface region is c/d=53.6/46.4 or 1.2; and the atomic ratio of the noble metal to the non-noble metal in the surface region is a/b=70.3/29.2 or 2.4, where the elemental concentrations a, b, c, d, e and f may be provided in atomic percent. The atomic ratio for a given region (e.g., the core region) may be determined based on the average concentration of the noble metal and the average concentration of the non-noble metal in the given region. The average concentration of the noble or non-noble metal may be determined by any of a variety of methods, including, for example, EDX or x-ray photoelectron spectroscopy (XPS) analysis.

Generally speaking, the atomic ratio of the noble metal to the non-noble metal in the surface and core regions of the bimetallic particle may be in the range of from about 0.5 to about 4, and the atomic ratio of the noble metal to the non-noble metal in the sub-surface region may be from about 0.2 to about 3. Typically, the atomic ratio of the noble metal to the non-noble metal in the surface and core regions is at least about 1, at least about 1.5, at least about 2, at least about 2.5, at least about 3, or at least about 3.5, and no greater than about 4. In the sub-surface region, the atomic ratio of the noble metal to the non-noble metal is typically less than 2.5, less than 2, less than 1.5, or less than 1, and at least about 0.2.

For example, the atomic ratio of the noble metal to the non-noble metal in the surface region of the bimetallic particle may be in the range of from about 2 to about 2.5, and the atomic ratio of the noble metal to the non-noble metal in the core region of the bimetallic particle may be in the range of from about 3 to about 3.5. The atomic ratio of the noble metal to the non-noble metal in the sub-surface region of the bimetallic particle may be from about 0.5 to less than 2, or from about 0.5 to about 1.5.

Depending on the size of the bimetallic particle, the core region may have a size or thickness of from about 4 nm to about 6 nm (or from about 20 atomic layers to about 30 atomic layers). The surface region may have a thickness of from about 1 nm to about 3 nm (or from about 5 atomic layers to about 15 atomic layers). The sub-surface region may have a thickness of from about 1 nm to about 5 nm (or from about 5 atomic layers to about 25 atomic layers).

Generally speaking, the core region may have a size or thickness of about 40% to about 60% of the size of the bimetallic particle, the surface region may have a size or thickness of about 10% to about 30% of the size of the bimetallic particle, and the sub-surface region may have a size or thickness of about 10% to about 50% of the size of the bimetallic particle. In some embodiments, the surface region and the sub-surface region may each have a size of about 10% to about 20% of the size of the bimetallic particle.

Figure 6:
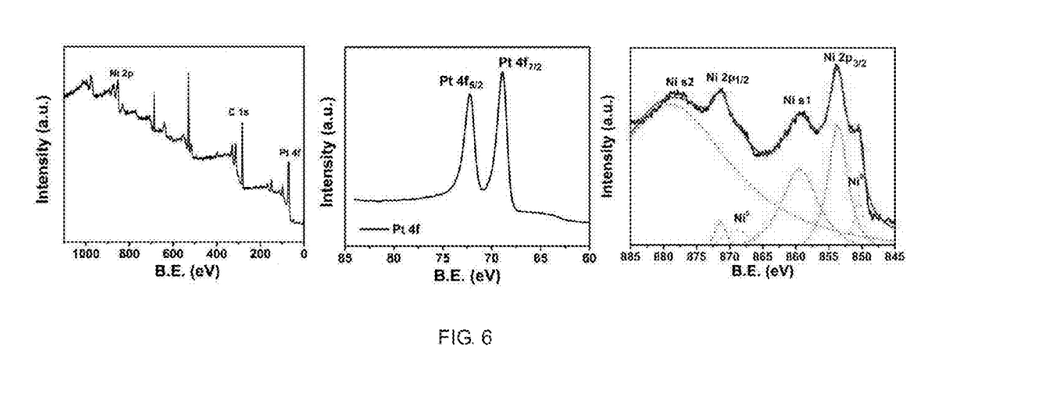
FIG. 6 shows x-ray photoelectron spectroscopy (XPS) spectra of Ni 2p/6 of $Pt_3Ni$ octahedral nanocrystals after annealing in vacuum at 210° C. for 1 hour.

The annealed Pt—Ni particles described above were also characterized by XPS analysis. FIG. 6 shows a quick survey XPS spectrum for the $Pt_3Ni$ alloy after the thermal treatment in vacuum at 210° C. Both Pt and Ni are easily identifiable in the spectra, e.g., at 68/72 and 854/872 eV, respectively. In addition, there is a strong peak at 531 eV that corresponds to O 1 s. XPS spectra show the fine surveys of Pt 4f and Ni 2p peaks, respectively. The Pt in the outermost layer of the surface region is pure metal while most of the Ni surface atoms are oxidized; this is because Ni is an active metal with a low redox potential of $Ni/Ni^{2+}$ (−0.25 eV) even if only a few Ni atoms are exposed on the surface. The XPS analysis shows that the surface composition of Ni and Pt at the outermost overall composition of $Pt_3Ni$ based on ICP-OES and EDX data, the formation of a $Pt_1Ni_1$ near surface alloy could be attributed to Ni segregation in the surface region.

TABLE 1

Surface composition (outermost layer) of Pt—Ni particle as determined by XPS.

| | Pt (atomic %) | Ni (atomic %) |
|---|---|---|
| 210° C. in vacuum | 46.74 | 53.26 |
| As-made $Pt_3Ni$ | 85.63 | 14.37 |

The noble metal-based electrocatalyst may include a plurality of the bimetallic particles. As explained above, because the annealing treatment may cause removal of any surface capping agents used during synthesis to prevent aggregation, the bimetallic particles may be partially or completely agglomerated. The particles may alternatively be non-agglomerated, for example, in the case when the bimetallic particles are dispersed on and attached to a carbon support prior to annealing.

The segregation effects may be more readily discerned in bimetallic particles that have a size of at least about 10 nm, although bimetallic particles as small as 4 nm may show a segregated structure. As indicated above, the size of the particle, which may be referred to as a nanocrystal or a nanoparticle, may be defined by the distance between opposing vertices of the polyhedron or between an opposing facet and vertex, depending on the geometry of the polyhedron.

The size may be at least about 5 nm, at least about 10 nm, at least about 15 nm, at least about 20 nm, at least about 25 nm, at least about 30 nm, at least about 40 nm, at least about 50 nm, at least about 60 nm, at least about 70 nm, or at least about 80 nm. Typically, the size of the particle is no greater than 100 nm, and may be about 90 nm or less, about 80 nm or less, about 70 nm or less, about 60 nm or less, or about 50 nm or less.

The polyhedral shape of the bimetallic particles may be selected from the group consisting of: cube, truncated octahedron, octahedron, truncated tetrahedron, tetrahedron, and icosahedron. The polyhedral shape includes a plurality of surface (exposed) facets, and particular facets may be exposed depending on the geometry of the polyhedron. For example, cubic particles may include {100} facets, truncated octahedral and truncated tetrahedral particles may include {111} and {100} facets, and octahedral and tetrahedral particles may include {111} facets. Exemplary Pt—Ni nanoparticles having an octahedral shape with {111} facets are shown in FIGS. 1-5, for example. Unlike spherical nanoparticles, the faceted nanoparticles described here, which may be synthesized through anisotropic growth by blocking or promoting the growth of a specific facet with a capping agent, may have some surfactant(s) on catalytically active surfaces in the as-synthesized state, as set forth in U.S. Patent Application Publication 2013/0133483, which is hereby incorporated by reference in its entirety.

The noble metal of the bimetallic particle may be selected from the group consisting of: Pt, Pd, Au, Ag, Ru, Rh, Os, and Ir. The non-noble metal of the bimetallic particle may be a transition metal selected from the group consisting of: Ti, V, Cr, Mn, Mo, Zr, Nb, Ta, Zn, In, Sn, Sb, Pb, W, Co, Cu, Ni and Fe. Preferably, the noble metal comprises Pt and the non-noble metal comprises Ni. The bimetallic particle may have a nominal composition prior to annealing of $Pt_xNi_y$, where the atomic ratio x:y may range from 1:1 to 3:1. For example, the bimetallic particle may have a nominal composition of $Pt_3Ni$ prior to annealing, as in the examples below.

Surface segregation may be further enhanced by exposing the bimetallic particle to an electrochemical treatment, such as a multi-cycle oxygen reduction reaction (ORR) measurement. ORR testing indicates the surface segregation of nickel in larger Pt—Ni particles (greater than 10 nm in size; e.g., 17 nm) was further improved under the ORR test condition. The bimetallic particle may be exposed to ORR measurement for 10 to 30 cycles, for example. After such an additional electrochemical treatment, the ORR activity of an annealed bimetallic particle may further increase, e.g., by at least about 10%, at least about 20%, at least about 30% at least about 40%, or at least about 50%.

Figure 7:
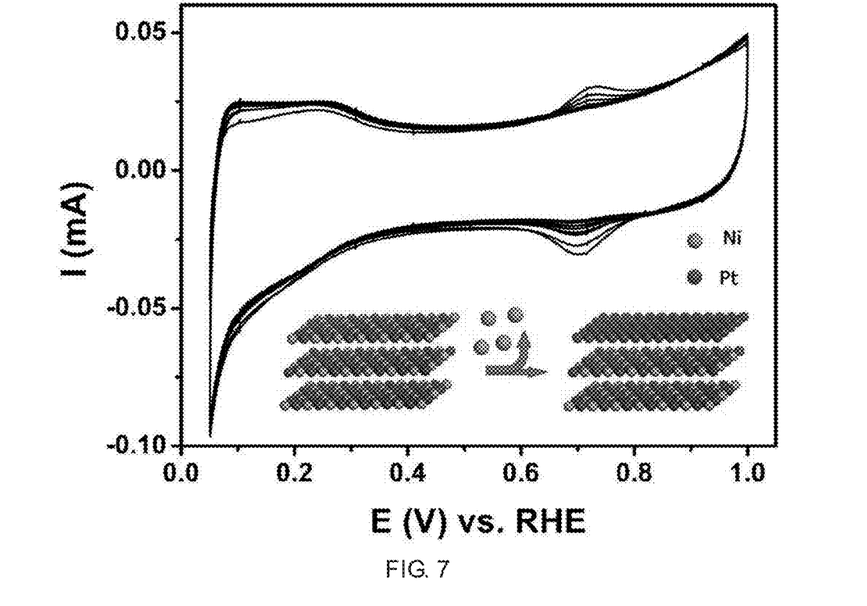
FIG. 7 shows electrochemical cyclic voltammetry curves of annealed $Pt_3Ni$ octahedra that reveal a decreasing Ni feature at the surface.
Figure 8:
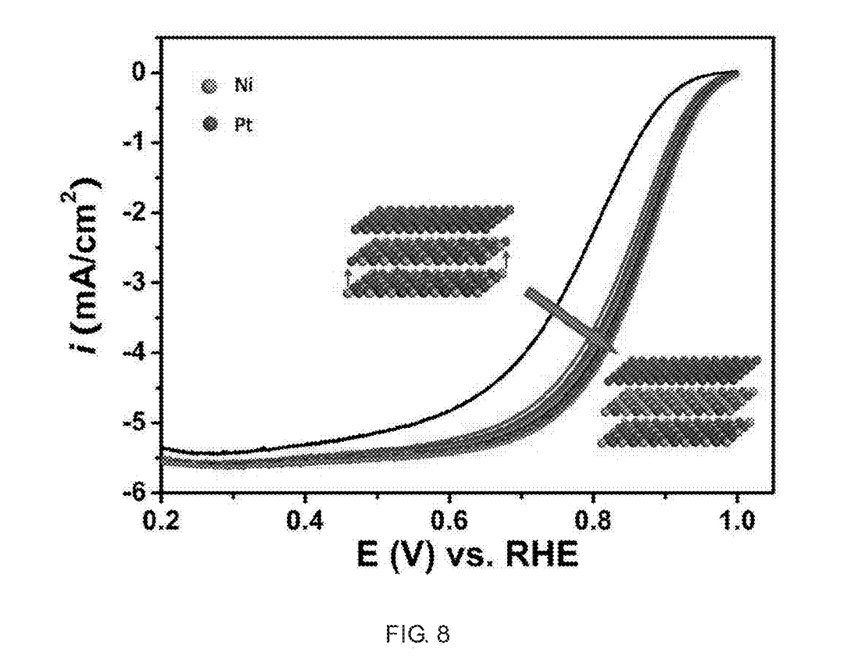
FIG. 8 shows multiple oxygen reduction reaction (ORR) polarization curves of annealed $Pt_3Ni$ octahedra.
Figure 9:
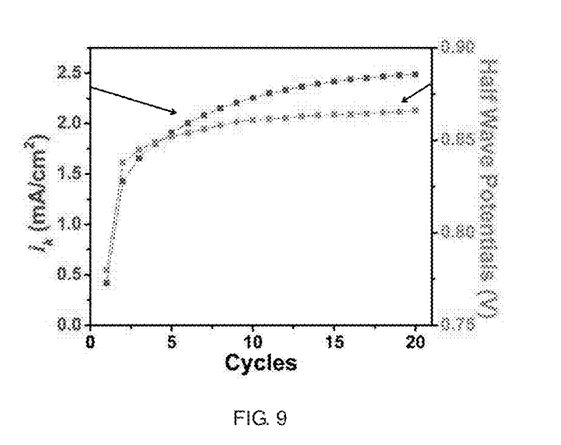
FIG. 9 shows a change of kinetic current density and half wave potentials during multiple ORR sweeps of annealed $Pt_3Ni$ octahedra.
Figure 10A:
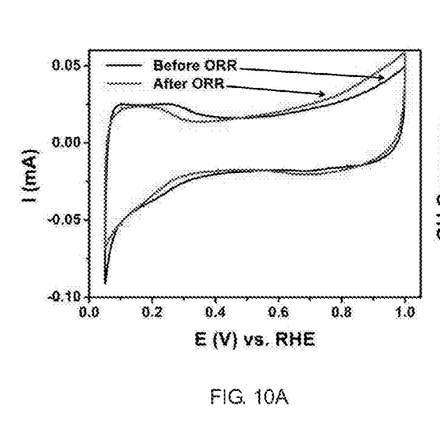
FIGS. 10A and 10B show changes of CV curve and OH coverage during ORR measurement of annealed $Pt_3Ni$ octahedra.
Figure 10B:
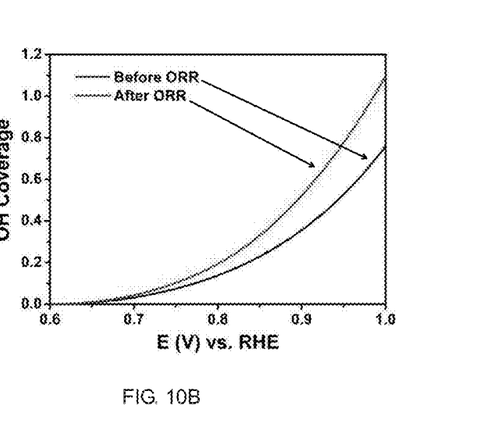
Figure 11:
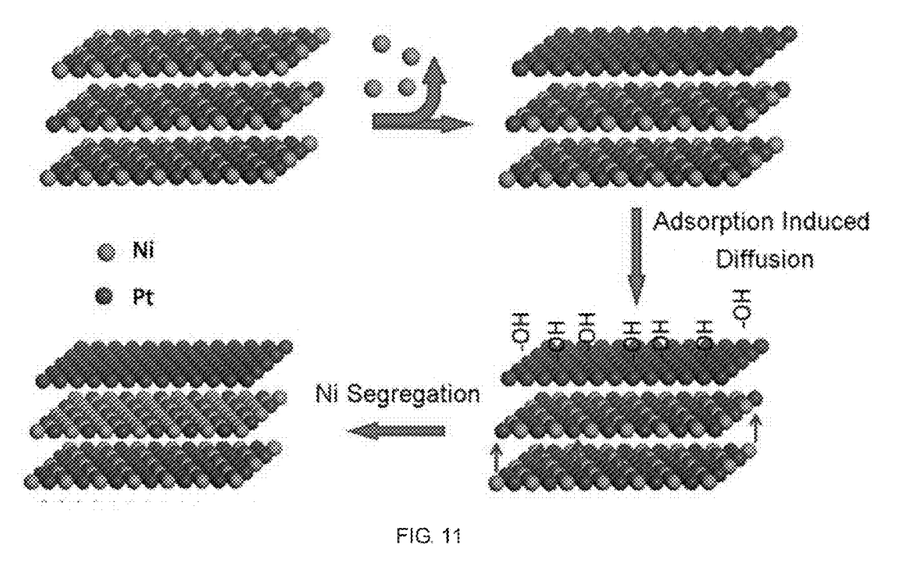
FIG. 11 is a schematic illustration of the change of new surface layers that may occur during electrochemical measurement of annealed Pt$_3$Ni octahedra.
Figure 12:
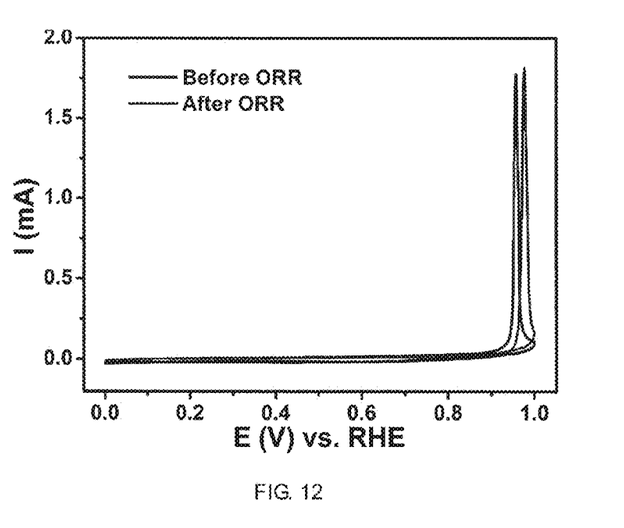
FIG. 12 shows CO stripping curves of annealed Pt$_3$Ni octahedra before and after 20-cycle ORR measurement.

In experiments carried out on annealed $Pt_3Ni$ particles, cyclic voltammetry shows stable hydrogen adsorption/desorption regions while there is decay in the OH ads/des peaks in the first five cycles between 0.6 V and 0.8 V in (FIG. 7), which is a feature of Ni sites. This phenomenon can be attributed to Ni leaching and may be observed in other Pt-based bimetallic systems (e.g., Pt—Co and Pt—Cu). Referring to FIG. 7, the surfaces of $Pt_3Ni$ bimetallic octahedral particles may become pure Pt (e.g., form a Pt skin) after Ni atoms in the outermost layer are dissolved into an acidic electrolyte during cyclic voltammetry. FIG. 8 shows the changes of the kinetic current density and the half wave potential with the cycles of ORR (see also FIG. 9). In the first three cycles, the $i_s$ and $V_{half-wave}$ have a significant increase followed by a flatter curve with a slow increase in the next 17 cycles, which indicates the Ni-rich near surface alloy is almost formed in 2-3 ORR cycles. After 20 sweeps, there is a big shift of ~100 mV between the first and the 20$^{th}$ cycle with a 6-time improvement in ORR activity at 0.9 V (FIGS. 8-9). This huge shift of half wave potential was attributed to the segregation of Ni atoms at the near-surface layer and the formation of Ni-rich sub-surface layers under the outermost pure Pt layer, which is induced by oxygen adsorption on Pt—Ni {111} surface (or facet). This Pt—Ni—Pt sandwich structure is believed to further strengthen the oxygen adsorption on the outermost pure Pt layer and enhance the ORR activity, which shifted uphill to the optimized position from that of Pt$_3$Ni octahedral nanoparticles in volcano plots. Interestingly, it appears that these phenomena may occur only in larger particles (>10 nm). Smaller particles in the range of about 5-7 nm do not exhibit this type of shift in ORR polarization curves, which indicates that segregation-induced enhancements may not occur. The CV curve after a 20-sweep ORR measurement is slightly different from the CV curve obtained before (FIG. 10A). The hydrogen adsorption/desorption region shrinks because of oxygen-induced segregated Ni at the near-surface layer, which weakens the sharp hydrogen adsorption/desorption peaks on Pt {111} surfaces. On the contrary, there is a strengthened peak at the region of OH adsorption. Both of these two effects contribute to enhanced OH coverage on Pt {111} surfaces (FIG. 10A). The enhanced ORR activity was consistent with the increasing OH coverage on the Pt surface after multiple repetitive ORR tests (FIG. 10B). Previous theoretical studies on the periodic surface model suggests that the adsorption strength on the (111) surface of Pt$_3$Ni with a pure Pt outermost layer is slightly weaker than the value to reach possible maximum ORR activity. The present study of 17 nm {111} facet-dominated Pt$_3$Ni octahedral particle catalysts suggest that the formation of a Ni-rich sub-surface alloy may increase the adsorption strength of oxygen because it shifts up the d-band center of the {111} surface of Pt$_3$Ni with a pure Pt top layer slightly closer to the value to reach possible maximum ORR activity. The schematic illustration of FIG. 11 illustrates that Ni leaching and oxygen adsorption may induce the surface segregation during chemical treatment. The peak in CO stripping curves (FIG. 12) has a positive shift of 20 mV, indicating a stronger binding of CO on the Pt surface due to Ni segregation to the sub-surface region, which is consistent with the ORR and OH coverage results.

In summary, segregation in Pt$_3$Ni octahedral particles is observed during annealing and a post-annealing electrochemical treatment, leading to the formation of the compositional sandwich structure described above. The electrochemical treatment may further enhance the segregation in 20 polarization cycles, as the sandwich structure formed by annealing strengthens the oxygen adsorption and increases the d-band center, thereby enhancing ORR activity. For the exemplary sample annealed at 210° C. in vacuum after ORR measurement, the ORR mass activity may reach or exceed 1.4 mA/µg$_{Pt}$ with an area activity of 4.8 mA/cm$^2$.

EXPERIMENTAL EXAMPLES

Synthesis of Pt$_3$Ni OctahedralNanoparticles

In a standard procedure, a solution of 20 mg (0.017 mmol) of Pt(acac)$_2$, 7 mg (0.05 mmol) of Ni(acac)$_2$, 9 mL of oleylamine (OAm), 1 mL (diphenyl ether) and 50 µL oleic acid (OA) was mixed in a 25 mL three-neck round bottom flask immersed in an oil bath at 130° C. The reaction mixture turned into a transparent yellowish solution at this temperature after 2 min. The flask was then transferred to a second oil bath at 210° C. under a flow of carbon monoxide gas (C.P. Grade, Airgas). The typical flow rate of CO gas was set at 190 cm3/min and the reaction time was 30 min. The rest of steps followed the procedures for the typical synthesis of Pt3Ni octahedral nanocrystals. The solid products were washed and separated by dispersing the reaction mixture in 2 mL of chloroform and 10 mL of ethanol, followed by centrifugation at 5000 rpm for 5 min. This procedure was repeated three times. The final products were dispersed in hexane for further characterization.

Preparation of Carbon-Supported Catalysts

Carbon black (Vulcan XC-72) was used as support for making platinum nickel catalysts (Pt$_3$Ni/C). In a standard preparation, carbon black particles were dispersed in hexane and sonicated for 1 h. A designed amount of platinum nickel nanoparticles were added to this dispersion at the nanoparticle-to-carbon-black mass ratio of 20:80. This mixture was further sonicated for 30 min and stirred overnight. The resultant solids were precipitated out by centrifugation and dried under an argon stream. The solid product was then re-dispersed in n-butylamine at a concentration of 0.5 mg-catalyst/mL. The mixture was kept under stirring for 3 days and then collected using a centrifuge at a rate of 5000 rpm for 5 min. The precipitate was re-dispersed in 10 mL methanol by sonicating for 15 min and then separated by centrifugation. This procedure was repeated three times. Then the carbon-supported Pt-based catalysts were dried before transferring them into the vacuum tube furnace.

Annealing Treatment

The carbon-supported Pt-based catalysts were heated in vacuum at a temperature of 210° C. for one hour before cooling down to room temperature. The final samples were stored in a vial for further characterization.

Characterization

Transmission electron microscopy specimens are prepared by dispersing 1 mg of reaction product in 1 mL of hexane. The dispersed reaction product is drop-cast onto a carbon-coated copper grid. Transmission electron microscopy (TEM) and high-resolution transmission electron microscopy (HR-TEM) images were taken on a FEI TECNAI F-20 field emission microscope at an accelerating voltage of 200 kV. The optimal resolution of this microscopy is 1 Å under TEM mode. Energy dispersive X-ray (EDX) analysis of particles was also carried out on a field emission scanning electron microscope (FE-SEM, Zeiss-Leo DSM982) equipped with an EDAX detector. Powder x-ray diffraction (PXRD) spectra are recorded with a Philips MPD diffractometer using a Cu K$_\alpha$ X-ray source ($\lambda$=1.5405 Å) at a scan rate of 0.013 2θ/s.

Electrochemical Measurement

A three-electrode cell was used to measure the electrochemical properties. The working electrode was a glassy-carbon rotating disk electrode (RDE) (area: 0.196 cm$^2$). A 1 cm$^2$ platinum foil was used as the counter electrode and a HydroFlex hydrogen electrode was used as the reference, which was placed in a separate compartment. Hydrogen evolution reaction (HER) was used to calibrate this hydrogen electrode before the tests. All potentials were referenced to the reversible hydrogen electrode (RHE). The electrolyte was 0.1 M HClO$_4$, diluted from 70% double-distilled perchloric acid (GFS Chemicals, USA) with Millipore ultra pure water. The mass of metal in each Pt$_3$Ni/C catalyst was determined by thermogravimetric analysis (TGA) using an SDT-Q600 TGA/DSC system from TA Instruments at a ramp rate of 10° C./min to 600° C. in air followed by annealing at 600° C. for 30 min under a forming gas of 5% hydrogen in argon at a flow rate of 50 ml/min. To prepare the working electrode, 5 mg of the $Pt_3Ni/C$ catalyst (20% based on the weight of alloy nanocrystals) was dispersed in 10 mL of a mixed solvent and sonicated for 5 min. The solvent contained a mixture of de-ionized water, isopropanol, and 5% Nafion at the volumetric ratio of 8:2:0.05. 20 µL of the suspension was added onto the RDE by a pipette and dried in air. The loading amount of $Pt_3Ni$ alloy nanocatalysts on the RDE was determined to be 9.3 $\mu g_{Pt}/cm^2$. The electrochemical active surface area (ECSA) was determined from the cyclic voltammetry (CV) curves. The amount of charges due to the adsorption of hydrogen species was obtained by integrating the area between 0.05 and 0.4 V. The CV measurement was carried in argon-saturated 0.1 M $HClO_4$ solution at room temperature with a scan rate of 50 mV/s. Oxygen reduction reaction (ORR) activities were determined in a 0.1 M $HClO_4$ solution which was purged with oxygen for 30 min prior to, and during testing. The scan rate for ORR measurement was set at 10 mV/s in the positive direction. Data were used without iR-drop correction. For comparison, Pt/C (E-TEK, 20 wt % Pt on Vulcan carbon) was used as the reference. The same procedure as described above was used to conduct the electrochemical measurement, except that the Pt loading was controlled at 11 $\mu g_{Pt}/cm^2$.

Although the present invention has been described with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A noble metal-based electrocatalyst comprising:
   a bimetallic particle comprising a noble metal and a non-noble metal and having a polyhedral shape, the bimetallic particle comprising a surface-segregated composition where an atomic ratio of the noble metal to the non-noble metal is higher in a surface region and in a core region than in a sub-surface region between the surface and core regions,
   wherein the core region has a size of from about 40% to about 60% of a size of the bimetallic particle, wherein the surface region has a thickness of from about 10% to about 30% of the size of the bimetallic particle, and wherein the sub-surface region has a thickness of from about 10% to about 50% of the size of the bimetallic particle.

2. The noble metal-based electrocatalyst of claim 1 further comprising a plurality of the bimetallic particles.

3. The noble metal-based electrocatalyst of claim 2, wherein the bimetallic particles are agglomerated.

4. The noble metal-based electrocatalyst of claim 2, wherein the bimetallic particles are non-agglomerated.

5. The noble metal-based electrocatalyst of claim 2, further comprising a support underlying the bimetallic particles, the bimetallic particles being dispersed on the support.

6. The noble metal-based electrocatalyst of claim 1, wherein the bimetallic particle has a size of at least about 10 nm.

7. The noble metal-based electrocatalyst of claim 1, wherein the polyhedral shape is selected from the group consisting of: cube, truncated octahedron, octahedron, truncated tetrahedron, tetrahedron, and icosahedron.

8. The noble metal-based electrocatalyst of claim 1, wherein the noble metal is selected from the group consisting of: Pt, Pd, Au, Ag, Ru, Rh, Os, and Ir, and wherein the non-noble metal is selected from the group consisting of: Ti, V, Cr, Mn, Mo, Zr, Nb, Ta, Zn, In, Sn, Sb, Pb, W, Co, Cu, Ni and Fe.

9. The noble metal-based electrocatalyst of claim 8, wherein the noble metal comprises Pt and the non-noble metal comprises Ni.

10. The noble metal-based electrocatalyst of claim 1, wherein an atomic ratio of the noble metal to the non-noble metal in the surface region and in the core region is from 0.5 to about 4.

11. The noble metal-based electrocatalyst of claim 1, wherein the atomic ratio of the noble metal to the non-noble metal in the sub-surface region is from about 0.2 to about 3.

12. The noble metal-based electrocatalyst of claim 1, wherein the polyhedral shape comprises {111} facets.

* * * * *